(12) United States Patent
Herman et al.

(10) Patent No.: US 12,235,385 B2
(45) Date of Patent: Feb. 25, 2025

(54) SENSOR MISALIGNMENT CORRECTION

(71) Applicant: Ford Global Technologies, LLC, Dearborn, MI (US)

(72) Inventors: David Michael Herman, West Bloomfield, MI (US); Catherine Marie Amodeo, Livonia, MI (US); Alexander George Shanku, Grosse Pointe Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 17/674,921

(22) Filed: Feb. 18, 2022

(65) Prior Publication Data

US 2023/0266438 A1   Aug. 24, 2023

(51) Int. Cl.
| G01S 7/40 | (2006.01) |
| G01S 13/931 | (2020.01) |
| G06N 20/00 | (2019.01) |

(52) U.S. Cl.
CPC .............. *G01S 7/40* (2013.01); *G01S 13/931* (2013.01); *G06N 20/00* (2019.01)

(58) Field of Classification Search
CPC ........ G01S 7/40; G01S 13/931; G01S 7/4972; G01S 17/34; G01S 17/931; G01S 2013/93273; G01S 7/497; G06N 20/00; G06N 3/0442; G06N 3/0464; G06N 3/047; G06N 3/045; G06N 3/092
See application file for complete search history.

(56) References Cited

U.S. PATENT DOCUMENTS

| 10,235,817 | B2 | 3/2019 | Saeger et al. | |
| 2012/0290169 | A1* | 11/2012 | Zeng | G01S 7/4972 |
| | | | | 701/30.2 |
| 2020/0210887 | A1* | 7/2020 | Jain | G01S 7/4972 |
| 2021/0003380 | A1 | 1/2021 | Diehi et al. | |
| 2021/0012166 | A1* | 1/2021 | Braley | G06F 18/251 |

FOREIGN PATENT DOCUMENTS

| CN | 112784656 A | 5/2021 |
| JP | 2009260442 A | 11/2009 |

* cited by examiner

*Primary Examiner* — James M McPherson
*Assistant Examiner* — Bakari Underwood
(74) *Attorney, Agent, or Firm* — Frank A. MacKenzie; Brooks Kushman P.C.

(57) ABSTRACT

A computer includes a processor and a memory storing instructions executable by the processor to predict a quantity of misalignment of an optical sensor based on a projected motion of a vehicle, predict an error of the predicted quantity of misalignment, and actuate the vehicle based on the predicted quantity of misalignment and the predicted error. The vehicle includes the optical sensor.

20 Claims, 4 Drawing Sheets

SENSOR MISALIGNMENT CORRECTION

BACKGROUND

Autonomous or semi-autonomous vehicles typically include optical sensors. The optical sensors detect the external world, e.g., objects and/or characteristics of surroundings of the vehicle, such as other vehicles, road lane markings, traffic lights and/or signs, pedestrians, etc. For example, the optical sensors can include radar sensors, scanning laser range finders, light detection and ranging (LIDAR) devices, and image processing sensors such as cameras. For autonomous and semi-autonomous vehicles, a computer can be programmed to operate the vehicle independently of the intervention of a human operator, completely or to a lesser degree, based on inputs that can include data received from the optical sensors.

DETAILED DESCRIPTION

Figure 1:
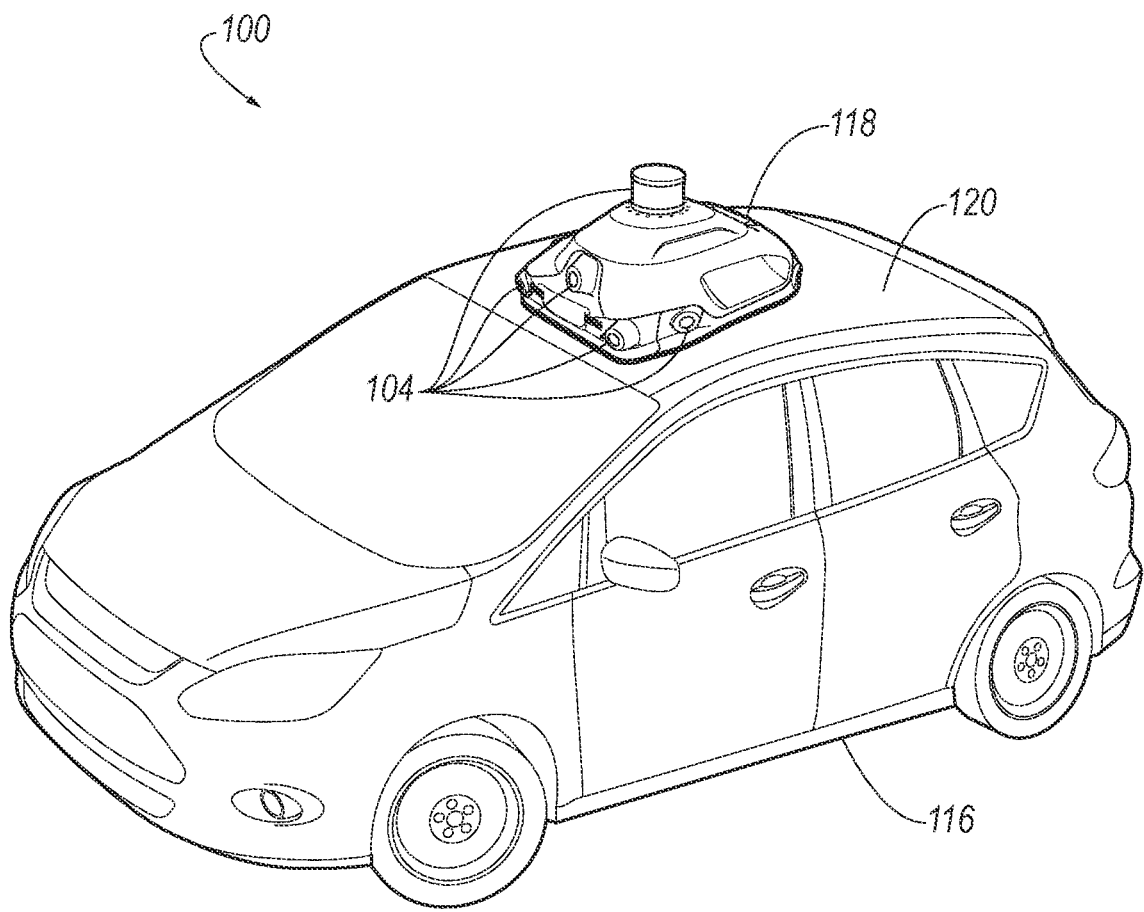
FIG. 1 is a perspective view of an example vehicle with optical sensors.

Optical sensors on a vehicle generate optical data that a computer of the vehicle can use for operating the vehicle. For the optical data to be usable by the computer, the optical sensors may need to have tight tolerances for motion relative to a body of the vehicle, e.g., for how much the optical sensor can twist, tilt, bounce, etc. compared to the body or to other sensors mounted on the body. One way to address the tight tolerance is to use a mounting structure for the optical sensors that has a high stiffness. Limiting the sensor motion can be achieved with higher stiffness materials, e.g., carbon fiber composites, with thicker components, active alignment, or with added components for reinforcement, any of which can add complexity and/or weight. Also, a higher stiffness can increase shocks transmitted from the body to the optical sensor. With increasing sensor resolution, the ability to limit sensor relative motion may not be achievable with existing methods based on perception algorithm requirements.

Techniques are provided herein that address the tolerances for the optical sensor in addition to or in lieu of increasing stiffness. A computer receiving the optical data can predict a quantity of misalignment of the optical sensor based on a projected motion of the vehicle, predict an error of the predicted quantity of misalignment, and actuate the vehicle based on the predicted quantity of misalignment and the predicted error. For example, whether the error is above or below a threshold can determine how the computer handles the quantity of misalignment. If the error is below the threshold, the computer can adjust the data being returned by the optical sensor to compensate for the misalignment and proceed with an already-determined plan for motion of the vehicle. If the error is above the threshold, the computer can instead modify the plan for motion of the vehicle, e.g., to provide a smoother ride by, e.g., swerving to avoid a pothole, changing a route to travel on paved roads instead of gravel roads, etc.

A computer includes a processor and a memory, and the memory stores instructions executable by the processor to predict a quantity of misalignment of an optical sensor based on a projected motion of a vehicle, the vehicle including the optical sensor; predict an error of the predicted quantity of misalignment; and actuate the vehicle based on the predicted quantity of misalignment and the predicted error.

Predicting the quantity of misalignment can be based on an upcoming profile of a road on which the vehicle is traveling.

Predicting the error can be based on an upcoming profile of a road on which the vehicle is traveling.

Predicting the error can be based on the projected motion of the vehicle.

Predicting the error can be performed without the predicted quantity of misalignment.

Predicting the quantity of misalignment can be based on at least one weather condition.

Predicting the error can be based on at least one weather condition.

Predicting the quantity of misalignment can be based on a motion state of the vehicle, and predicting the error can be based on the motion state of the vehicle.

The instructions can further include instructions to, in response to the predicted error being below a threshold, adjust data from the optical sensor based on the predicted quantity of misalignment. Actuating the vehicle can include actuating the vehicle based on the adjusted data from the optical sensor.

The instructions can further include instructions to, in response to the predicted error exceeding a threshold, modify a plan for motion of the vehicle. Actuating the vehicle can include actuating the vehicle based on the modified plan for the motion of the vehicle.

Predicting the quantity of misalignment can include executing a machine-learning algorithm. The instructions can further include instructions to determine the quantity of misalignment of the optical sensor, and train the machine-learning algorithm based on the determined quantity of misalignment of the optical sensor.

The machine-learning algorithm can be a first machine-learning algorithm, and predicting the error can include executing a second machine-learning algorithm distinct from the first machine-learning algorithm. The first machine-learning algorithm can be a different model than the second machine-learning algorithm.

Predicting the error can include executing a machine-learning algorithm. The instructions may further include instructions to determine the quantity of misalignment of the optical sensor, and train the machine-learning algorithm based on the determined quantity of misalignment of the optical sensor. Training the machine-learning algorithm can be further based on the predicted quantity of misalignment of the optical sensor.

A method includes predicting a quantity of misalignment of an optical sensor based on a projected motion of a vehicle, the vehicle including the optical sensor; predicting an error of the predicted quantity of misalignment; and actuating the vehicle based on the predicted quantity of misalignment and the predicted error.

With reference to the Figures, wherein like numerals indicate like parts throughout the several views, a computer 102 includes a processor and a memory storing instructions executable by the processor to predict a quantity of misalignment 106 of an optical sensor 104 based on a projected motion of a vehicle 100, predict an error 108 of the predicted quantity of misalignment 106, and actuate the vehicle 100 based on the predicted quantity of misalignment 106 and the predicted error 108. The vehicle 100 includes the optical sensor 104, e.g., among a plurality of optical sensors 104.

With reference to FIG. 1, the vehicle 100 may be any suitable type of ground vehicle, e.g., a passenger or commercial automobile such as a sedan, a coupe, a truck, a sport utility, a crossover, a van, a minivan, a jeepney, a taxi, a bus, etc.

The vehicle 100 may be an autonomous vehicle. The computer 102 can be programmed to operate the vehicle 100 independently of the intervention of a human operator, completely or to a lesser degree. The computer 102 may be programmed to operate a propulsion 110, a brake system 112, a steering system 114, and/or other vehicle systems based at least in part on data from the optical sensors 104 (shown in FIG. 2). For the purposes of this disclosure, autonomous operation means the computer 102 controls the propulsion 110, brake system 112, and steering system 114 without input from a human operator; semi-autonomous operation means the computer 102 controls one or two of the propulsion 110, brake system 112, and steering system 114 and a human operator controls the remainder; and nonautonomous operation means a human operator controls the propulsion 110, brake system 112, and steering system 114.

The vehicle 100 includes a body 116. The vehicle 100 may be of a unibody construction, in which a frame and the body 116 of the vehicle 100 are a single component. The vehicle 100 may, alternatively, be of a body-on-frame construction, in which the frame supports the body 116 that is a separate component from the frame. The frame and the body 116 may be formed of any suitable material, for example, steel, aluminum, etc.

The vehicle 100 includes at least optical sensor 104, e.g., a plurality of optical sensors 104. The optical sensors 104 generate optical data from receiving electromagnetic radiation, e.g., radio waves, infrared radiation, visible light, etc. The optical sensors 104 can be any suitable type for detecting objects spaced from the vehicle 100, e.g., radar sensors, scanning laser range finders, light detection and ranging (LIDAR) devices, and/or image processing sensors such as cameras. For example, the optical sensors 104 can include cameras such as charge-coupled devices (CCD), complementary metal oxide semiconductors (CMOS), etc. For another example, the optical sensors 104 can include a pair of stereo cameras including a first camera and a second camera. For another example, the optical sensors 104 can include a LIDAR, which detects distances to objects by emitting laser pulses at a particular wavelength and measuring the time of flight for the pulse to travel to the object and back. For another example, the optical sensors 104 can include a radar, which can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves. A radar can return distances to objects as well as radial velocity, i.e., the component of velocity toward or away from the radar. The optical sensors 104 could also include cameras for different wavelengths of electromagnetic radiation, cameras that detect polarization, time-of-flight cameras, event-based cameras, light-field cameras, etc.

The optical sensors 104 are rigidly mounted to the body 116 of the vehicle 100. For example, the vehicle 100 can include a housing 118 mounted on a roof 120 or other body panel of the body 116 of the vehicle 100, and the housing 118 can support the optical sensors 104. The housing 118 may be shaped to be attachable to the roof 120, e.g., may have a shape matching a contour of the roof 120. The housing 118 may be attached to the roof 120, which can provide the optical sensors 104 mounted inside the housing 118 with an unobstructed field of view of an area around the vehicle 100. Alternatively or additionally, the optical sensors 104 can be mounted to the windshield, front fascia, corner fascia, rear fascia, rear liftgate, etc. The housing 118 may be formed of, e.g., plastic or metal.

Figure 2:
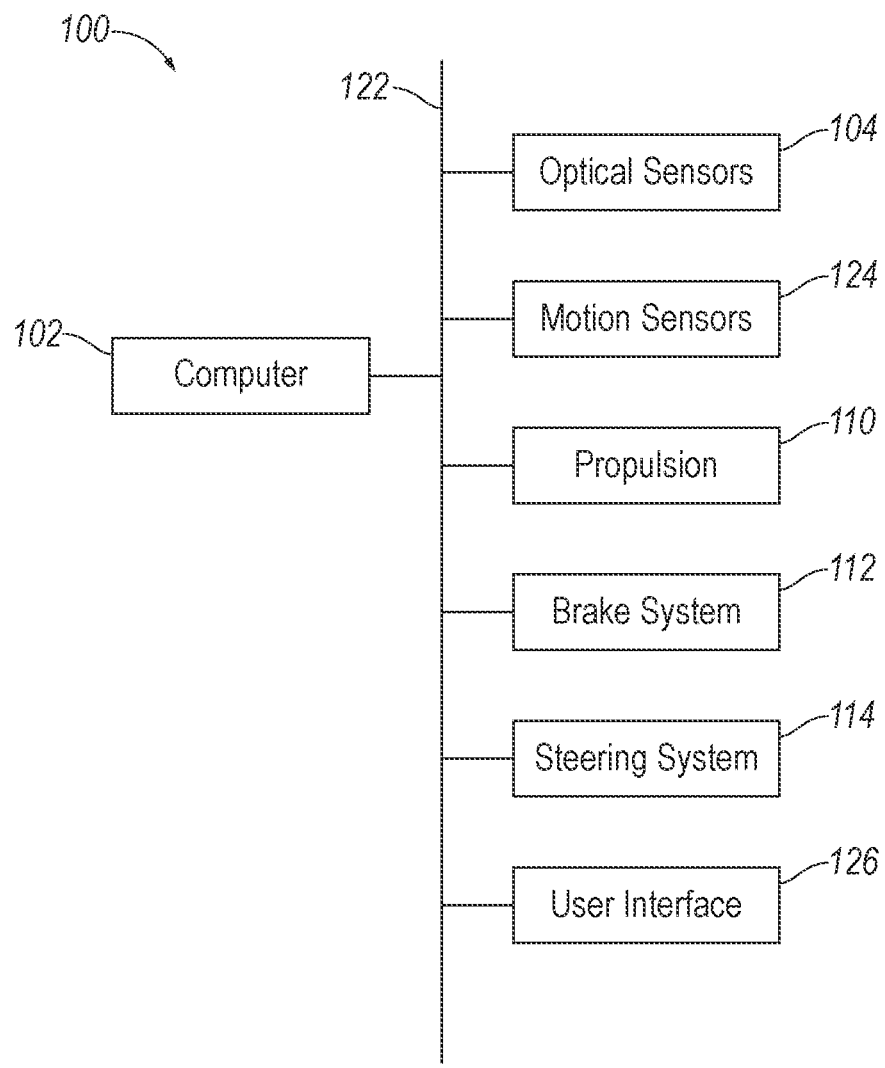
FIG. 2 is a block diagram of the vehicle.

With reference to FIG. 2, the computer 102 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 may transmit and receive data through a communications network 122 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to the optical sensors 104, motion sensors 124, the propulsion 110, the brake system 112, the steering system 114, a user interface 126, and other components via the communications network 122.

The vehicle 100 includes the motion sensors 124. The motion sensors 124 provide motion data, i.e., data indicating motion of the vehicle 100. For example, the motion sensors 124 may detect the location and/or orientation of the vehicle 100, linear and rotational velocity of the vehicle 100, acceleration of the vehicle 100, etc. For example, the motion sensors 124 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. For another example, the motion sensors 124 may provide data about operation of systems of the vehicle 100 controlling the motion of the vehicle 100, i.e., the propulsion 110, the brake system 112, and/or the steering system 114, e.g., wheel speed, wheel orientation, steering angle, braking force, etc.

The propulsion 110 of the vehicle 100 generates energy and translates the energy into motion of the vehicle 100. The propulsion 110 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 110 can include an electronic control unit (ECU) or the like that is in communication with and receives input from the computer 102 and/or a human operator. The human operator may control the propulsion 110 via, e.g., an accelerator pedal and/or a gear-shift lever.

The brake system 112 is typically a conventional vehicle braking subsystem and resists the motion of the vehicle 100 to thereby slow and/or stop the vehicle 100. The brake system 112 may include friction brakes such as disc brakes, drum brakes, band brakes, etc.; regenerative brakes; any other suitable type of brakes; or a combination. The brake system 112 can include an electronic control unit (ECU) or the like that is in communication with and receives input from the computer 102 and/or a human operator. The human operator may control the brake system 112 via, e.g., a brake pedal.

The steering system 114 is typically a conventional vehicle steering subsystem and controls the turning of the wheels. The steering system 114 may be a rack-and-pinion system with electric power-assisted steering, a steer-by-wire system, as both are known, or any other suitable system. The steering system 114 can include an electronic control unit (ECU) or the like that is in communication with and receives input from the computer 102 and/or a human operator. The human operator may control the steering system 114 via, e.g., a steering wheel.

The user interface 126 presents information to and receives information from an occupant of the vehicle 100. The user interface 126 may be located, e.g., on an instrument panel in a passenger cabin of the vehicle 100, or wherever may be readily seen by the occupant. The user interface 126 may include dials, digital readouts, screens, speakers, and so on for providing information to the occupant, e.g., human-machine interface (HMI) elements such as are known. The user interface 126 may include buttons, knobs, keypads, microphone, and so on for receiving information from the occupant.

Figure 3:
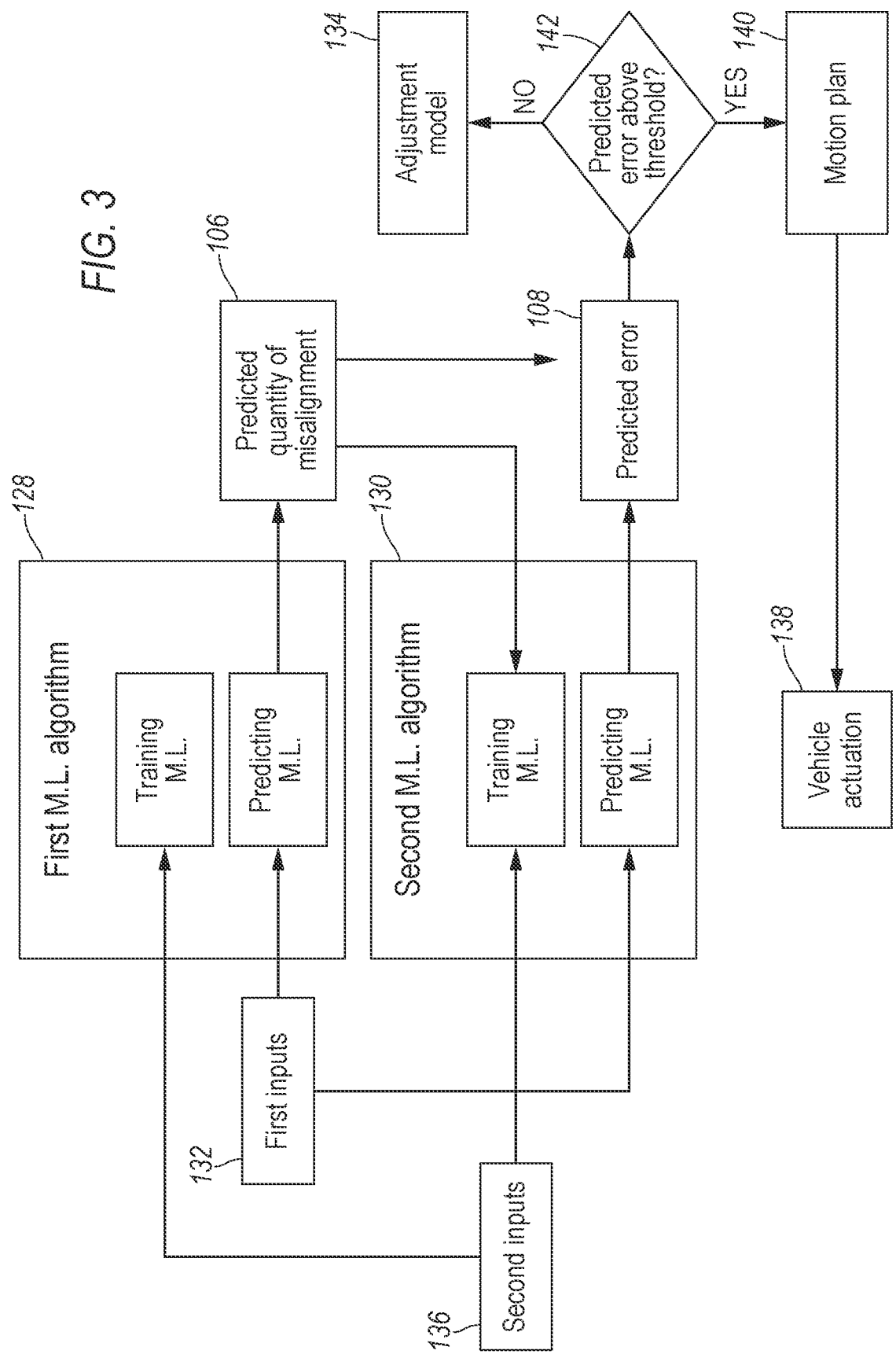
FIG. 3 is a diagram of example machine-learning algorithms for determining misalignment of the optical sensors.

FIG. 3 is a diagram of an example set of machine-learning algorithms including a first machine-learning algorithm 128 to predict the quantity of misalignment 106 of one of the optical sensors 104 and a second machine-learning algorithm 130 to predict the error 108 of the predicted quantity of misalignment 106. First inputs 132 to the machine-learning algorithms can include a motion state of the vehicle 100, a projected motion of the vehicle 100, an upcoming profile of a road on which the vehicle 100 is traveling, and weather conditions.

Predicting the quantity of misalignment 106 of the optical sensor 104 can be based on the motion state of the vehicle 100. Predicting the error 108 can also be based on the motion state of the vehicle 100. For the purposes of this disclosure, a "motion state" of a vehicle is defined as a description of movement by the vehicle and forces, etc. affecting the movement at a particular moment, e.g., the present moment. For example, the motion state can include a position of the vehicle 100, a velocity of the vehicle 100 (e.g., a speed and a heading), an angular velocity of the vehicle 100 (e.g., roll, pitch, and yaw), a linear acceleration of the vehicle 100, extensions of suspension components, etc.

Predicting the quantity of misalignment 106 can be based on the projected motion of the vehicle 100. Predicting the error 108 can also be based on the projected motion of the vehicle 100. For the purposes of this disclosure, "projected motion" of a vehicle is defined as a description of movement by the vehicle at a future time, either a future moment or a future interval. The projected motion of the vehicle 100 can be derived from autonomous or nonautonomous (i.e., human) operation of the vehicle 100. For example, the projected motion can be a series of projected positions of the vehicle 100 at respective future times, e.g., time series data. For another example, the projected motion can be a curve through space for the vehicle 100 to follow. The curve can be represented by a formula, e.g., a polynomial.

For example, the projected motion of the vehicle 100 can be based on a motion plan 140 of the vehicle 100. For the purposes of this disclosure, a "motion plan" is a set of instructions regarding motion for a vehicle to follow. The computer 102 can be programmed to determine the motion plan 140, e.g., using known algorithms for autonomous operation to determine instructions for the propulsion 110, brake system 112, and steering system 114 based on data received from the optical sensors 104, among other data.

Predicting the quantity of misalignment 106 can be based on the upcoming profile of the road on which the vehicle 100 is traveling. Predicting the error 108 can also be based on the upcoming profile of the road on which the vehicle 100 is traveling. For the purposes of this disclosure, a "road profile" is defined as a shape of a road. For example, the road profile can include a grade, a slope from a center line to an edge or curb of the road, locations of road disturbances such as speed bumps or potholes, a surface roughness, a material type (e.g., gravel vs. paved), etc. The computer 102 can be programmed to determine the upcoming road profile, e.g., based on data from the optical sensors 104, e.g., three-dimensional data from a LIDAR sensor. Alternatively or additionally, the computer 102 can be programmed to determine the upcoming road profile, e.g., by consulting high-definition map data stored in the computer 102 and localizing the vehicle 100 at a position in the map data, e.g., using GPS data, dead reckoning, etc.

Predicting the quantity of misalignment 106 can be based on at least one weather condition, e.g., a plurality of weather conditions. Predicting the error 108 can also be based on at least one weather condition, e.g., a plurality of weather conditions. For example, the weather conditions can include temperature, humidity, precipitation rate, etc. The computer 102 can determine the weather conditions, e.g., by receiving a message from a remote server including the weather conditions, receiving data from a precipitation sensor of the vehicle 100, etc.

The computer 102 can be programmed to predict the quantity of misalignment of the optical sensor 104 based on one or more of the first inputs 132. The quantity of misalignment is a numerical description of how misaligned the optical sensor 104 is relative to a neutral or baseline position. For example, the quantity of misalignment can be expressed as two angles representing rotation from the neutral position (e.g., pitch and yaw), or as three angles representing rotation from the neutral position (e.g., pitch, yaw, and roll). For another example, if the optical sensor 104 is a camera, the quantity of misalignment can be expressed as offsets in two dimensions in units of pixels, representing vertical and horizontal movement from the neutral position to a current misaligned position of an image frame from the camera. The computer 102 can be programmed to output the predicted quantity of misalignment 106 as time series data, i.e., as a series of quantities of misalignment at respective future times.

Predicting the quantity of misalignment 106 can include executing the first machine-learning algorithm 128. The first machine-learning algorithm 128 can be any suitable algorithm for determining a series of values at future times, e.g., a recurrent neural network such as a long short-term memory (LSTM) network, a convolutional neural network such as one using a waterfall model, etc.

The first machine-learning algorithm 128 can be trained offline, i.e., before installation on the computer 102 on board the vehicle 100. The first machine-learning algorithm 128 can be trained using a dataset of the first inputs 132 gathered while operating a vehicle of a same type as the vehicle 100, with an optical sensor of a same type mounted in a same manner as the optical sensor 104 of interest. The actual quantity of misalignment of the optical sensor can be recorded to serve as a ground truth for the training.

The computer 102 can be programmed to train the first machine-learning algorithm 128 online, i.e., while operating the vehicle 100 after the first machine-learning algorithm 128 has been installed on the computer 102 on board the vehicle 100. The computer 102 can train the first machine-learning algorithm 128 based on second inputs 136, e.g., the motion state of the vehicle 100, a current profile of the road on which the vehicle 100 is traveling, weather conditions, a determined quantity of misalignment of the optical sensor 104, etc. For example, the computer 102 can train the first machine-learning algorithm 128 based on a determined quantity of misalignment of the optical sensor 104 (determined as described immediately below). For example, the computer 102 can use reinforcement learning with the determined quantity of misalignment as ground truth. On-board training of the first machine-learning algorithm 128 can increase accuracy by incorporating changes to the vehicle 100, e.g., to the vibration response, that may occur over time due to wear of the vehicle 100.

The computer 102 can be programmed to determine the quantity of misalignment of the optical sensor 104. For example, the computer 102 can determine the quantity of misalignment based on data from the optical sensor 104 and from the motion sensors 124 according to an adjustment model 134, as described below.

For the purposes of this disclosure, an "adjustment model" is a transformation of optical data into different optical data based on other data. The adjustment model 134 can correct for distortion and/or misalignment of the optical sensors 104. Adjusting the optical data using the adjustment model 134 can be based on the motion data from the motion sensors 124. For example, the adjustment model 134 can be a model of motion of the optical sensor 104 relative to the vehicle 100 resulting from motion of the vehicle 100. For example, the adjustment model 134 can be a physics-based model such as based on finite-element analysis and/or based on an approximation using ideal elements of the attachment of the optical sensors 104 to the body 116 using the housing 118, e.g., four ideal beams connecting the optical sensor 104 to the body 116, e.g., the roof 120 of the vehicle 100. The adjustment model 134, e.g., finite-element analysis, can use geometry of the attachment of the optical sensors 104, boundary conditions, and/or the motion data. For example, the adjustment model 134 can track motion of the optical sensors 104 in one or more degrees of freedom, e.g., six degrees of freedom or three rotational degrees of freedom. Using three rotational degrees of freedom without linear degrees of freedom can be computationally less intensive that using six degrees of freedom while still capturing the relevant effects. Furthermore, discrete time steps of the adjustment model 134 may further be interpolated or extrapolated to the corresponding time frame of the optical data from the optical sensors 104, e.g., time steps for global-shutter effect, rolling-shutter frame-by-frame exposure time, update times for event-based cameras, timeframes for beam steering for a LIDAR, etc. The determined quantity of misalignment can be the correction applied by the adjustment model 134 to the optical data.

The computer 102 can be programmed to predict the error 108 of the predicted quantity of misalignment 106 based on one or more of the first inputs 132. The error can be a number, e.g., a scalar number, representing an uncertainty of the predicted quantity of misalignment 106, e.g., as a range such as a variance or standard deviation. The computer 102 can be programmed to output the predicted error 108 as time series data, i.e., as a series of errors for respective predicted quantities of misalignment 106. Predicting the error 108 can be performed without the predicted quantity of misalignment 106, i.e., the predicted quantity of misalignment 106 is not an input for predicting the error 108. Predicting the quantity of misalignment 106 and predicting the error 108 can therefore be performed in parallel, permitting faster prediction of the error 108.

Predicting the error 108 can include executing the second machine-learning algorithm 130. The second machine-learning algorithm 130 can be distinct from the first machine-learning algorithm 128, e.g., performed in parallel. The second machine-learning algorithm 130 can be any suitable algorithm for determining a value or values, e.g., a Bayesian neural network, a classifier such as a tree-based model, etc. The first machine-learning algorithm 128 can be a different model than the second machine-learning algorithm 130. For example, the first machine-learning algorithm 128 can be a different type of model than the second machine-learning algorithm 130. For another example, the first machine-learning algorithm 128 can be the same type but with different numbers of layers, weights, biases, etc. than the second machine-learning algorithm 130.

The second machine-learning algorithm 130 can be trained offline, i.e., before installation on the computer 102 on board the vehicle 100. The second machine-learning algorithm 130 can be trained using a dataset of the first inputs 132 gathered while operating a vehicle 100 of a same type as the vehicle 100, with an optical sensor 104 of a same type mounted in a same manner as the optical sensor 104, and with the first machine-learning algorithm 128 running A difference between the predicted quantity of misalignment 106 and the actual quantity of misalignment can be recorded to serve as a ground truth for the training.

The computer 102 can be programmed to train the second machine-learning algorithm 130 online, i.e., while operating the vehicle 100 after the second machine-learning algorithm 130 has been installed on the computer 102 on board the vehicle 100. The computer 102 can train the second machine-learning program based on the second inputs 136, e.g., the motion state of the vehicle 100, a current profile of the road on which the vehicle 100 is traveling, weather conditions, a determined quantity of misalignment of the optical sensor 104, etc., as well as on the predicted quantity of misalignment 106. For example, the computer 102 can train the second machine-learning algorithm 130 based on the difference between the determined quantity of misalignment and the predicted quantity of misalignment 106. For example, the computer 102 can use reinforcement learning with the difference as ground truth. On-board training of the second machine-learning algorithm 130 can increase accuracy by incorporating changes to the vehicle 100 that can cause changes to the first machine-learning algorithm 128.

The computer 102 can be programmed to actuate the vehicle 100 based on the predicted quantity of misalignment 106 and the predicted error 108. The actuation 138 of the propulsion 110, the brake system 112, and the steering system 114 can change depending on the values of the predicted quantity of misalignment 106 and the predicted error 108. For example, as shown in FIG. 3, the computer 102 can adjust data from the optical sensor 104 based on the predicted quantity of misalignment 106 in response to the predicted error 108 being below a threshold 142, and the computer 102 can modify the plan 140 for motion of the vehicle 100 in response to the predicted error 108 exceeding the threshold 142. The threshold 142 can be chosen based on a range of error over which the adjustment model 134 can accurately adjust the optical data. The threshold 142 can be stored in the memory of the computer 102.

The computer 102 can be programmed to adjust the data from the optical sensor 104 based on the predicted quantity of misalignment 106 by using the adjustment model 134, described above. The computer 102 can then actuate the propulsion 110, the brake system 112, and the steering system 114 according to the motion plan 140 based on the adjusted data. The motion plan 140 can be unchanged in response to the predicted error 108 being below the threshold 142.

The computer 102 can be programmed to modify the motion plan 140. The motion plan 140 can be modified such that the vehicle 100 will experience reduced vibrations from the road. For example, the computer 102 can change a planned route of the vehicle 100 to travel over smoother roads, e.g., paved rather than gravel, in other words, changing global path planning. For another example, the computer 102 can change a planned path of the vehicle 100 to avoid a pothole or other road disturbance responsible for the predicted error 108 exceeding the threshold 142. For another example, the computer 102 can reduce a speed of the vehicle 100. For another example, the computer 102 can prevent an advanced driver assistance (ADAS) feature from being engaged, e.g., cruise control, lane-keeping assist, etc.

For example, the computer 102 can be programmed to indirectly modify the motion plan 140 by temporarily disregarding data from the optical sensor 104; e.g., if the vehicle 100 will pass over a pothole, the computer 102 can disregard the data from the optical sensor 104 while the vehicle 100 passes over the pothole and for a preset duration thereafter. The preset duration can be chosen based on how long vibrations affecting the optical sensor 104 take to decay. Disregarding the data from the optical sensor 104 can prevent an ADAS feature from being engaged if that ADAS feature relies on the data from the optical sensor 104 when determining whether to engage. Disregarding the data from the optical sensor 104 can change the results of sensor fusion of data from multiple sensors including the optical sensor 104, which can cause different autonomous operation of the vehicle 100.

Figure 4:
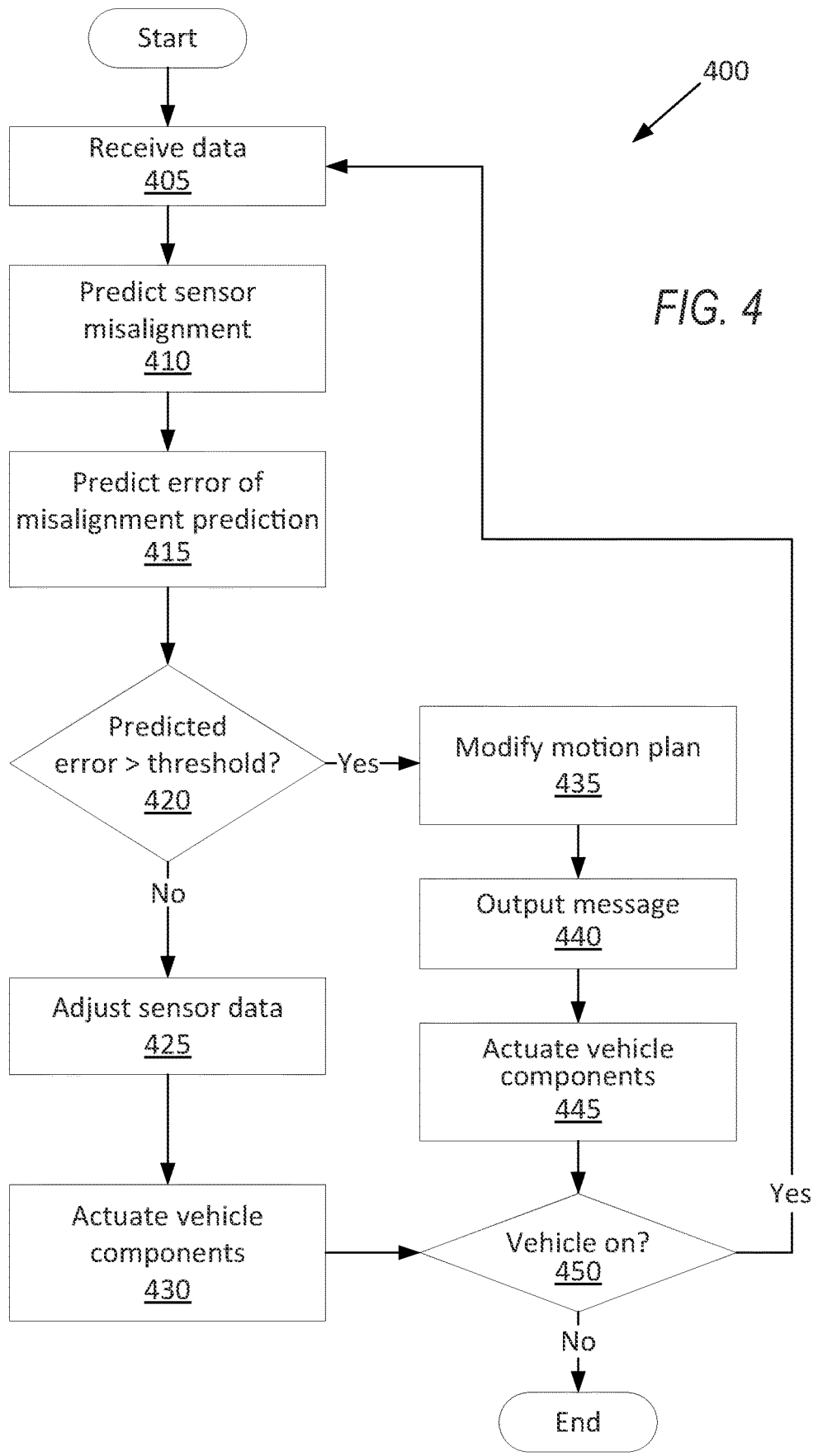
FIG. 4 is a process flow diagram of an example process for actuating components of the vehicle based on the misalignment of the optical sensors.

FIG. 4 is a process flow diagram illustrating an exemplary process 400 for actuating the vehicle 100 based on the misalignment of the optical sensors 104. The memory of the computer 102 stores executable instructions for performing the steps of the process 400 and/or programming can be implemented in structures such as mentioned above. As a general overview of the process 400, the computer 102 receives sensor data, predicts the quantity of misalignment of the optical sensor 104, and predicts the error of the predicted quantity of misalignment 106. In response to the predicted error 108 being below the threshold 142, the computer 102 adjusts the data from the optical sensor 104 according to the adjustment model 134 and actuates the vehicle 100. In response to the predicted error 108 exceeding the threshold 142, the computer 102 modifies the motion plan 140, outputs a message indicating that the motion plan 140 has been modified, and actuates the vehicle 100. The process 400 continues for as long as the vehicle 100 is on.

The process begins in a block 405, in which the computer 102 receives data from the optical sensors 104 and the motion sensors 124, as well as other data for determining the first inputs 132, as described above.

Next, in a block 410, the computer 102 predicts the quantity of misalignment 106 of the optical sensor 104 of interest, as described above.

Next, in a block 415, the computer 102 predicts the error 108 of the predicted quantity of misalignment 106, as described above.

Next, in a decision block 420, the computer 102 determines whether the predicted error 108 exceeds the threshold 142, as described above. In response to the predicted error 108 being below the threshold 142, the process 400 proceeds to a block 425. In response to the predicted error 108 exceeding the threshold 142, the process 400 proceeds to a block 435.

In the block 425, the computer 102 adjusts the data from the optical sensor 104 based on the predicted quantity of misalignment 106 according to the adjustment model 134, as described above.

Next, in a block 430, the computer 102 actuates the vehicle 100, e.g., actuates the propulsion 110, the brake system 112, and/or the steering system 114, based on the adjusted data from the optical sensor 104, as described above. The computer 102 can actuate the propulsion 110, the brake system 112, and/or the steering system 114 according to the unmodified motion plan 140. After the block 430, the process 400 proceeds to a decision block 450.

In the block 435, the computer 102 modifies the motion plan 140 for the vehicle 100, as described above.

Next, in a block 440, the computer 102 outputs a message, e.g., via the user interface 126, indicating that the motion plan 140 has been changed, e.g., that a route has been updated, that the vehicle 100 is swerving to avoid a pothole, that an ADAS feature is being disengaged, etc.

Next, in a block 445, the computer 102 actuates the vehicle 100, e.g., actuates the propulsion 110, the brake system 112, and/or the steering system 114, based on the modified motion plan 140 for the vehicle 100, as described above. After the block 445, the process 400 proceeds to the decision block 450.

In the decision block 450, the computer 102 determines whether the vehicle 100 is still on. If the vehicle 100 is still on, the process 400 returns to the block 405 to continue iterating. If the vehicle 100 has been turned off, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first" and "second" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory, the memory storing instructions executable by the processor to:
   execute an algorithm to predict a numerical quantity of misalignment of an optical sensor, a future projected motion of a vehicle being an input to the algorithm, the vehicle including the optical sensor;
   predict an error of the predicted numerical quantity of misalignment, the error representing an uncertainty of the predicted numerical quantity of misalignment; and
   actuate at least one of a propulsion, a brake system, or a steering system of the vehicle using the predicted numerical quantity of misalignment and the predicted error.

2. The computer of claim 1, wherein an upcoming profile of a road on which the vehicle is traveling is an input to the algorithm for the predicted numerical quantity of misalignment.

3. The computer of claim 1, wherein an upcoming profile of a road on which the vehicle is traveling is an input to predicting the error.

4. The computer of claim 1, wherein the future projected motion of the vehicle is an input to predicting the error.

5. The computer of claim 1, wherein predicting the error is performed without the predicted quantity of misalignment.

6. The computer of claim 1, wherein at least one weather condition is an input to the algorithm for the predicted numerical quantity of misalignment.

7. The computer of claim 1, wherein at least one weather condition is an input to predicting the error.

8. The computer of claim 1, wherein a motion state of the vehicle is an input to the algorithm for the predicted numerical quantity of misalignment, and the motion state of the vehicle is an input to predicting the error.

9. The computer of claim 1, wherein the instructions further include instructions to, in response to the predicted error being below a threshold, adjust data from the optical sensor using the predicted quantity of misalignment.

10. The computer of claim 9, wherein actuating the at least one of the propulsion, the brake system, or the steering system of the vehicle includes actuating the at least one of the propulsion, the brake system, or the steering system of the vehicle using the adjusted data from the optical sensor.

11. The computer of claim 1, wherein the instructions further include instructions to, in response to the predicted error exceeding a threshold, modify a plan for motion of the vehicle.

12. The computer of claim 11, wherein actuating the vehicle includes actuating the vehicle using the modified plan for the motion of the vehicle.

13. The computer of claim 1, wherein the algorithm for the predicted numerical quantity of misalignment is a machine-learning algorithm.

14. The computer of claim 13, wherein the instructions further include instructions to determine the quantity of misalignment of the optical sensor, and train the machine-learning algorithm using the determined quantity of misalignment of the optical sensor.

15. The computer of claim 13, wherein the machine-learning algorithm is a first machine-learning algorithm, and predicting the error includes executing a second machine-learning algorithm distinct from the first machine-learning algorithm.

16. The computer of claim 15, wherein the first machine-learning algorithm is a different model than the second machine-learning algorithm.

17. The computer of claim 1, wherein predicting the error includes executing a machine-learning algorithm.

18. The computer of claim 17, wherein the instructions further include instructions to determine the quantity of misalignment of the optical sensor, and train the machine-learning algorithm using the determined quantity of misalignment of the optical sensor.

19. The computer of claim 18, wherein training the machine-learning algorithm further uses the predicted quantity of misalignment of the optical sensor.

20. A method comprising:

executing an algorithm to predict a numerical quantity of misalignment of an optical sensor, a future projected motion of a vehicle being an input to the algorithm, the vehicle including the optical sensor;

predicting an error of the predicted numerical quantity of misalignment, the error representing an uncertainty of the predicted numerical quantity of misalignment; and actuating at least one of a propulsion, a brake system, or a steering system of the vehicle using the predicted numerical quantity of misalignment and the predicted error.

* * * * *